United States Patent [19]

Doi et al.

[11] Patent Number: 5,306,794
[45] Date of Patent: Apr. 26, 1994

[54] METHOD OF PRODUCING COPOLYMER

[75] Inventors: Toru Doi; Yoshihiko Sugiura, both of Yokkaichi, Japan

[73] Assignee: Tosoh Corporation, Yamaguchi, Japan

[21] Appl. No.: 952,419

[22] Filed: Sep. 29, 1992

[30] Foreign Application Priority Data

Oct. 2, 1991 [JP] Japan ................................. 3-280302

[51] Int. Cl.$^5$ .................. C08F 222/40; C08F 210/00; C08F 210/10
[52] U.S. Cl. ................................. 526/262; 526/348; 526/348.7; 526/209; 526/210; 526/216
[58] Field of Search ............ 526/262, 348, 348.7, 526/209, 210, 216

[56] References Cited

U.S. PATENT DOCUMENTS 4,063,010 12/1977 Marie et al. .................... 526/169

FOREIGN PATENT DOCUMENTS 0055502 7/1982 European Pat. Off. .
1273001 8/1961 France .
61-250010 11/1986 Japan .
1-190709 7/1989 Japan .

OTHER PUBLICATIONS

Fujiwara et al. JP 61-250,010 (Abstract).

*Primary Examiner*—Joseph L. Schofer
*Assistant Examiner*—Wu C. Cheng
*Attorney, Agent, or Firm*—Nixon & Vanderhye

[57] ABSTRACT

The present invention provides a method of producing a maleimide-olefin copolymer having excellent transparency. The production method employs precipitation polymerization for producing a maleimide-olefin copolymer by radical polymerization of a maleimide and an olefin.

13 Claims, No Drawings

METHOD OF PRODUCING COPOLYMER

BACKGROUND OF THE INVENTION

1. Field of the Invention

The present invention relates to a method of producing a maleimide-olefin copolymer having excellent transparency.

2. Description of the Related Art

A maleimide polymer, mainly phenyl maleimide, has been investigated as a polymer material having high heat resistance for many years. However, since the polymer product becomes remarkably brittle as the number of maleimide units is increased, the maleimide polymer is generally used only as a heat resistance modifier for ABS by adding in an amount of several tens %. In addition, the use of phenyl maleimide significantly causes coloring of the polymer product, thereby causing a critical problem according to the application.

A copolymer of an alkyl maleimide and a specified olefin has practical mechanical strength in spite of its high maleimide content, and is an interesting material having excellent heat resistance. However, since the copolymer product is easily colored by the effects of remaining monomers, impurities and the like, a copolymer having excellent optical properties cannot be easily industrially produced.

Generally known methods of radical polymerization of vinyl monomers include a suspension polymerization method, an emulsion polymerization method, a solution polymerization method and the like. The suspension polymerization method and emulsion polymerization method are frequently used in the industrial field.

However, when one of the above polymerization methods is employed for polymerizing a maleimide and an olefin, the problems below are produced. Since many maleimides are solid compounds at room temperature and are slightly soluble in olefins, it is difficult to employ a polymerization method such as the suspension polymerization method, the emulsion polymerization method or the like, which is generally applied to liquid monomers. In addition, since the above polymerization methods use a dispersion stabilizer or an emulsifying agent, the methods are undesirable from the viewpoint of deterioration in the optical properties of the produced polymers.

Further, in the case of a maleimide polymer, there is the problem that if maleimide or impurities remain in the produced polymer, as described above, the transparency and color tone of the polymer significantly deteriorate. From this point of view, the above polymerization methods are unsatisfactory production methods.

Although a homogeneous solution polymerization method is a production method suitable for polymerization of solid monomers, the polymerization method also has the following problems. For example, the produced polymer can be purified by precipitating from the polymer solution produced by reaction using a poor solvent to obtain a copolymer having a relatively good color tone. However, this method is impractical because of the problems that the produced polymer cannot be easily industrially purified by the above reprecipitation method, and that the production process becomes complicated. In addition, although a method of removing the solvent from the obtained polymer solution by distillation, flushing or the like is a relatively simple method, the method has the problem of significantly coloring the produced polymer.

As described above, it has been so far difficult to industrially produce a maleimide-olefin copolymer having excellent transparency and color tone.

SUMMARY OF THE INVENTION

Accordingly, an object of the present invention is to provide an industrial method of producing a maleimide-olefin copolymer, and particularly to provide a method of producing a maleimide-olefin copolymer having excellent transparency and color tone.

As a result of energetic investigation performed by the inventors in consideration of the above problems, it was found that the object is achieved by a production method using a specified polymerization solvent. This led to the achievement of the present invention.

The present invention relates to a method of producing a maleimide-olefin copolymer using a precipitation polymerization method in which a maleimide-olefin copolymer is produced by radical polymerization of a maleimide and an olefin using a polymerization solvent which dissolves the maleimide and does not dissolve the produced polymer to precipitate the produced polymer in a granular form.

The use of the production method of the present invention enables the production of a polymer having very low yellowness and good transparency. It is though that this is caused by dissolution of remaining monomers or impurities such as denatured substances of the monomers and the like, which seem to affect the color tone of the produced polymer, in the solvent and removal from the produced polymer.

In addition, since the production method of the present invention does not use an emulsifying agent, a dispersant or the like, which is used in the general emulsion polymerization method, suspension polymerization method or the like, the method is excellent in the point that a polymer having excellent optical properties can be obtained.

Further, since the production method of the present invention produces a granular polymer the production process comprising a separation step, a drying step and so on can be simplified.

In the production method of the present invention, a polymerization solvent which easily dissolves maleimides and olefins and which does not dissolve the produced polymer to precipitate the produced polymer in a granular form must be used as the polymerization solvent.

The average grain size of the produced polymer grains is 50 to 2000 $\mu$m, preferably 100 to 1000 $\mu$m. An average gain size less than 50 $\mu$m is undesirable because the polymer grains are scattered or cause clogging of a filter during filtration separation and are thus difficult to handle. An average grain size over 2000 $\mu$m is also undesirable because the produced polymer tends to be colored.

The bulk density of the produced polymer grains is 0.1 to 1.0 g/cm$^3$, preferably 0.2 to 0.8 g/cm$^3$. A bulk density less than 0.1 g/cm$^3$ is undesirable because the polymer grains are difficult to handle and are processed into pellets or a molded product with poor workability. A bulk density over 1.0 g/cm$^3$ is also undesirable because the produced polymer tends to be colored.

The polymerization solvent preferable from the viewpoint of the production of a polymer decreases the amount of the polymer (scale) which adheres to the reactor or agitator used.

An example of polymerization solvents which are preferably used in the production method of the present invention is a solvent mixture containing an aromatic solvent and at least one selected from the group consisting of alcohols, ketones, acetates and ethers.

Examples of aromatic solvents includes benzene, toluene, xylene, ethylbenzene, propylbenzene, butylbenzene and the like.

Examples of alcohols include methyl alcohol, ethyl alcohol, n-propyl alcohol, i-propyl alcohol, n-butyl alcohol, i-butypl alcohol, s-butyl alcohol, t-butyl alcohol, hexyl alcohol, cyclohexyl alcohol, lauryl alcohol, stearyl alcohol and the like.

Examples of ketones include acetone, diethyl ketone, methyl ethyl ketone, cylcohexanone, and the like.

Examples of acetates include methyl acetate, ethyl acetate, n-propyl acetate, i-propyl acetate, n-butyl acetate, i-butyl acetate, s-butyl acetate, t-butyl acetate, hexyl acetate and the like.

Examples of ethers include dimethyl ether, diethyl ether, tetrahydrofuran, dioxane and the like.

Of these solvents, mixture solvents containing alcohols and aromatic solvents are preferable from the viewpoint of occurrence of little scale. Particularly, a mixture solvent containing methanol and toluene is preferable.

Although the ratio of an alcohol, ketone, acetate or ether to an aromatic solvent depends upon the composition of the monomers charged and the substituents of maleimide, the ratio is 98/2 to 2/98% by weight, preferably 90/10 to 20/80% by weight.

Another example of polymerization solvents which are preferably used in the production method of the present invention is a mixture solvent containing an acetate and at least one selected from the group consisting of alcohols, ketones and ethers. The ratio of an alcohol, ketone or ether to an acetate is 98/2 to 2/98% by weight, preferably 90/10 to 20/80% by weight.

A further preferable polymerization solvent is nitrile solvent. Examples of nitrile solvents used in the production method of the present invention include lower aliphatic nitriles such as acetonitrile, propionitrile, butyronitrile and the like. Acetonitrile is particularly preferable.

A still further preferable polymerization solvent is an aromatic solvent shown by the following formula (3). Examples of aromatic solvents include benzene, xylene, ethylbenzene, propylbenzene, butylbenzene and the like. Xylene and ethylbenzene are particularly preferable.

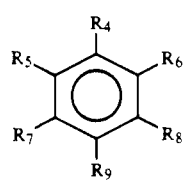

(3)

(wherein $R_4$ to $R_9$ each denote a hydrogen atom, an alkyl group having 1 to 6 carbon atoms, a hydroxyl group or a halogen atom).

Maleimides that are preferably used in the present invention are N-alkyl-substituted maleimides expressed by the following formula (1):

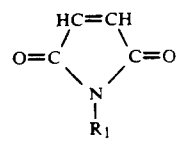

(1)

wherein $R_1$ denotes a (cyclo)alkyl group having 1 to 6 carbon atoms).

Examples of such maleimides include N-methylmaleimide, N-ethylmaleimide, N-n-propylmaleimide, N-i-propylmaleimide, N-n-butylmaleimide, N-i-butylmaleimide, N-s-butylmaleimide, N-t-butylmaleimide, N-n-hexylmaleimide, N-cyclopropylmaleimide, N-cylcobutylmaleimide, N-cyclohexylmaleimide and the like. These compounds may be used singly or in combination of two or more compounds. Of these compounds, N-methylmaleimide is preferably used from the viewpoints of the heat resistance, mechanical properties and so on of the produced polymer.

Compounds expressed by the following formula (2) are preferably used as olefins in the present invention;

(2)

(wherein $R_2$ and $R_3$ each denote a hydrogen atom or an alkyl group having 1 to 6 carbon atoms).

Preferable examples of such compounds include ethylene, isobutene, 2-methyl-1-butene, 2-methyl-1-pentene, 2-methyl-1-hexene, 1-methyl-1-heptene, 1-isooctene, 2-methyl-1-octene, 2-ethyl-1-pentene, 2-methyl-2-butene, 2-methyl-2-pentene, 2-methyl-2-hexene and the like. These compounds may be used singly or in combination of two or more compounds. Particularly, isobutene is preferable from the viewpoints of reactivity, the mechanical properties of the produced polymer and so on.

Although the ratio between the maleimide and the olefin used in the present invention is not limited, the ratio of the olefin used is within the range of 0.1 to 50 mol, preferably 1.0 to 20 mol, more particularly 2.0 to 15 mol, relative to 1 mol of maleimide, from the viewpoints of reactivity and the like.

Generally known radical polymerization catalysts can be used as a radical polymerization initiator in the production method of the present invention. Examples of such initiators include organic peroxides such as benzoyl peroxide, lauryl peroxide, octanoyl peroxide, acetyl peroxide, di-t-butyl peroxide, t-butylcumyl peroxide, dicumyl peroxide, t-butyl peroxyacetate, t-butyl peroxybenzoate, perbutyl neodecanoate and the like; azo-type initiators such as 2,2'-azobis(2,4-dimethylvaleronitrile), 2,2'-azobis(2-butyronitrile), 2,2'-azobisisobutyronitrile, dimethyl-2,2'-azobisisobutyrate, 1,1'-azobis(cyclohexane-1-carbonitrile) and the like. These catalysts may be used singly or in combination of two or more compounds.

The amount of the catalyst used is 0.0001 to 1.0 mol %, preferably 0.001 to 0.1 mol %, relative to the total amount of monomers. The total amount of catalyst may be added in an early stage of polymerization, or may be divided into several portions and added during polymerization.

The polymerization temperature can be appropriately determined in accordance with the decomposition temperature of the initiator used. However, the polymerization temperature is preferably within the range of 40° to 150° C. The polymerization temperature may be constant throughout reaction or continuously or stepwise increased and decreased.

Although the polymerization time is not particularly limited, the time is 0.1 to 50 hours, preferably 1 to 20 hours.

The production method of the present invention can be performed in a batch manner or continuous manner. The material of the reactor used is not limited, and it can be selected in view of the effects of the metals remaining in the produced polymer, scale and the like. The reactor may be lined with glass in order to prevent the occurrence of scale.

Agitation conditions are not limited, and a general anchor-type, spiral or bloomer gin-type agitating element or the like can be used. The rate of agitation is generally 50 to 2000 rpm.

In addition, if required, a chain transfer agent such as alkyl mercaptan or the like may be added. A hindered phenol type or phosphorus type antioxidant may also be added in an early stage of polymerization, during polymerization or after polymerization.

Further, a dispersion stabilizer may be added for stabilizing polymer grains within a range which does not cause deterioration in the characteristics of the produced polymer.

If required, other vinyl monomers can be copolymerized. Examples of other vinyl monomers include styrene, α-methylstyrene, vinyltoluene, 1,3-butadiene, isoprene, 2-butene and halogen-substituted derivatives thereof; methacrylates such as methyl methacrylate, ethyl methacrylate, cyclohexyl methacrylate, phenyl methacrylate, benzyl methacrylate and the like; acrylates such as methyl acrylate, ethyl acrylate, butyl acrylate, cyclohexyl acrylate, phenyl acrylate, benzyl acrylate and the like; vinyl esters such as vinyl acetate, vinyl benzoate and the like; vinyl ethers such as methyl vinyl ether, ethyl vinyl ether, propyl vinyl ether, butyl vinyl ether, and the like; vinyl chloride, vinylidene chloride and acrylonitrile. At least one of these compounds is selected as a vinyl monomer.

Although such a monomer can be added within a range which does not result in a failure of achievement of the object of the present invention, the amount of the monomer added is 15 mol % or less, preferably 5 mol % or less, more preferably 3 mol % or less, relative to the amount of maleimide. The addition of a vinyl monomer in an amount over the above value is undesirable because it has the tendency to decrease the transparency, color tone, thermal stability and mechanical strength of the produced polymer, and the tendencies to increase the scale and cause blocking.

The polymer grains obtained by the aforementioned method are washed by a solvent which will dissolve maleimides and olefins and which will no dissolve the produced polymer grains so that the transparency of the produced polymer can be improved.

Examples of washing solvents include aromatic solvents such as toluene, xylene and the like; alcohols such as methanol, ethanol and the like; ketones such as methyl ethyl ketone, cyclohexanone and the like; ethers such as diethyl ether and the like; acetates such as methyl acetate, ethyl acetate propyl acetate, butyl acetate an the like.

The maleimide-olefin copolymer obtained by the production method of the present invention comprises a maleimide repeating unit [formula (4)] and an olefin repeating unit [formula (5)]. The ratio of the maleimide unit is 30 to 98 mol %, preferably 40 to 75 mol %, more preferably 50 to 70 mol %, of the total amount. The weight average molecular weight of the copolymer, which is determined by gel permeation chromatography (GPC), is $1 \times 10^3$ to $1 \times 10^7$, preferably $1 \times 10^4$ to $1 \times 10^6$.

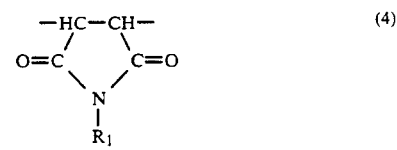

(4)

(wherein $R_1$ denotes a (cyclo) alkyl group having 1 to 6 carbon atoms)

(5)

(wherein $R_2$ and $R_3$ each denote a hydrogen atom or an alkyl group having 1 to 6 carbon atoms)

The maleimide-olefin copolymer obtained by the above method has a very low degree of yellowness and excellent transparency, and can thus be used as various optical materials, illumination parts, sheets, films and the like.

DESCRIPTION OF THE PREFERRED EMBODIMENTS

Although the present invention is described below with reference to examples, the present invention is not limited to the examples.

The molecular weight of the produced polymer was measured by GPC (manufactured by Tosoh Corporation, HLC-802A) and was determined in terms of polystrene.

The light transmittance was measured by using a specimen which was formed by small precision injection molding machine Minimat (manufactured by Sumitomo Jukikikai-kogyo K. K.) using the pellets formed by Laboplastmill (Toyo-seiki K. K.) in accordance with ASTM 1746. The yellowness of the polymers was evaluated by a color computer (manufactured by Suga Shikenki K. K.) using a pressed piece of $50 \times 25 \times 0.8$ mm in accordance with JIS K710 (reflection method: three stimulus values of a reflecting plate, X; 97.44; Y; 82.22, Z; 94.51).

EXAMPLE 1

117.7 g of N-methylmaleimide and 2,2'-azobisisobutyronitrile (AIBN) were dissolved in a mixture solvent of toluene and methanol (weight ratio 5/5), and 1.5 l of the thus-formed solution was charged in a 3-1 autoclave provided with an anchor-type agitator, a nitrogen inlet tube, a thermometer and a deairing tube. After the solution was purged with nitrogen several times, 854 ml of isobutene was charged in the autoclave, followed by reaction at an agitation rate of 500 rpm and at 60° C. for 10 hours.

The precipitated polymer grains were filtered off and then dried under reduced pressure at 60° C. for 24 hours. The yield was 175 g. The produced polymer grains had an average grain size of 250 μm, a bulk density of 0.35 g/cm³ and a scale content of 1% or less.

The amount of the monomers remaining in the polymer obtained was 0.1% by weight or less. The results (C; 64.7% by weight, H; 7.8% by weight, N; 8.4% by weight) or elemental analysis of the polymer obtained showed that the maleimide unit in the produced polymer was 50 mol %. The polymer obtained had a molecular weight (Mw) of 250000, a glass transition temperature (Tg) of 152° C. and a decomposition temperature (Td) of 397° C. The optical characteristics of the polymer obtained are shown in Table 1.

EXAMPLE 2

117.7 g of N-methylmaleimide and 0.8 g of perbutyl neodecanoate were dissolved in a mixture solvent of toluene and methanol (weight ratio 7/3), and 1.5 l of the thus-formed solution was charged in a 3-l autoclave provided with a bloomer gin-type agitator, a nitrogen inlet tube, a thermometer and a deairing tube. After the solution was purged with nitrogen several times, 854 ml of isobutene was charged in the autoclave, followed by reaction at an agitation rate of 500 rpm and at 60° C. for hours.

The precipitated polymer grains were filtered off and then dried under reduced pressure at 60° C. for 24 hours. The yield was 174 g. The produced polymer grains had an average grain size of 200 μm, a bulk density of 0.37 g/cm³ and a scale content of 1% or less.

The amount of the monomers remaining in the polymer obtained was 0.1% by weight or less. The results of elemental analysis of the polymer obtained showed that the maleimide unit in the produced polymer was 50 mol %. The polymer obtained had a molecular weight (Mw) of 180000, a glass transition temperature (Tg) of 153° C. and a decomposition temperature (Td) of 397° C. The optical characteristics of the polymer obtained are shown in Table 1.

EXAMPLE 3

Part of the polymer grains obtained in Example 1 were transferred to the reaction and then agitated in 2 l of toluene at 60° C. for 1 hour. The polymer was filtered off and then dried under reduced pressure at 60° C. for 24 hours. The optical characteristics of the polymer obtained are shown in Table 1.

EXAMPLE 4

117.7 g of N-methylmaleimide and 0.94 g of lauryl peroxide were dissolved in a mixture solvent of butyl acetate and methyl ethyl ketone (weight ratio 7/3), and 1.5 l of the thus-formed solution was charged in a 3-l autoclave provided with an anchor-type agitator, a nitrogen inlet tube, a thermometer and a deairing tube. After the solution was purged with nitrogen several times, 854 ml of isobutene was charged in the autoclave, followed by reaction at an agitation rate of 600 rpm and at 70° C. for 8 hours.

The precipitated polymer grains were filtered off and then dried under reduced pressure at 60° C. for 24 hours. The yield was 174 g. The produced polymer grains had an average grain size of 470 μm and a scale content of 3.5%.

The amount of the monomers remaining in the polymer obtained was 0.1% by weight or less. The results (C; 64.7% by weight, H; 7.8% by weight, N; 8.4% by weight) of elemental analysis of the polymer obtained showed that the N-alkylmaleimide unit in the produced polymer was 50 mol %. The polymer obtained had a molecular weight (Mw) of 220000, a glass transition temperature (Tg) of 155° C. and a decomposition temperature (Td) of 397° C. The optical characteristics of the polymer obtained are shown in Table 1.

EXAMPLE 5

117.7 g of N-methylmaleimide and 0.8 g of perbutyl neodecanoate were dissolved in a mixture solvent of ethyl acetate and butanol (weight ratio 6/4), and 1.5 l of the thus-formed solution was charged in a 3-l autoclave provided with a bloomer gin-type agitator, a nitrogen inlet tube, a thermometer and a deairing tube. After the solution was purged with nitrogen several times, 767 ml of isobutene was charged in the autoclave, followed by reaction at an agitation rate of 800 rpm and at 60° C. for 5 hours.

The precipitated grains were filtered off, transferred to the reactor, and then agitated in 1.5 l methanol at 60° C. for 30 minutes. The polymer was filtered off and then dried under reduced pressure at 60° C. for 24 hours. The yield was 174 g. The produced polymer grains had an average grain size of 830 μm and a scale content of 8.4%.

The amount of the monomers remaining in the polymer obtained was 0.1% by weight or less. The results of elemental analysis of the polymer obtained showed that the N-alkylmaleimide unit in the produced polymer was 50 mol %. The polymer obtained had a molecular weight (Mw) of 180000, a glass transition temperature (Tg) of 154° C. and a decomposition temperature (Td) of 397° C. The optical characteristics of the polymer obtained are shown in Table 1.

EXAMPLE 6

32.8 g of N-methylmaleimide and 0.26 g of perbutyl neodecanoate were dissolved in xylene, and 0.5 l of the thus-formed solution was charged in a 1-l autoclave provided with an anchor-type agitator, an isobutene inlet tube, a nitrogen inlet tube, a thermometer and a deairing tube. After the solution was purged with nitrogen several times, 240 ml of liquefied isobutene was charged in the autoclave, followed by reaction at an agitation rate of 600 rpm and at 60° C. for 8 hours.

The precipitated grains were filtered off, and then dried under reduced pressure at 60° C. for 24 hours. The yield was 45 g. The produced polymer grains had an average grain size of 130 μm and a scale content of 6.5%.

The amount of the monomers remaining in the polymer obtained was 0.1% by weight or less. The results of elemental analysis of the polymer obtained showed that the N-methylmaleimide unit in the produced polymer was 50 mol %. The polymer obtained had a molecular weight (Mw) of 120000, a glass transition temperature (Tg) of 155° C. and a decomposition temperature (Td) of 397° C. The optical characteristics of the polymer obtained are shown in Table 1.

EXAMPLE 7

32.8 g of N-methylmaleimide and 0.8 g of perbutyl neodecanoate were dissolved in ethylbenzene, and 0.5 l of the thus-formed solution was charged in a 1-l autoclave provided with a bloomer gin-type agitator, an isobuten inlet tube, a nitrogen inlet tube, a thermometer and a deairing tube. After the solution was purged with nitrogen several times, 240 ml of liquefied isobutene was charged in the autoclave, followed by reaction at an agitation rate of 500 rpm and at 60° C. for 5 hours.

The precipitated grains were filtered off, transferred to the reactor and then agitated in 0.5 l of methanol at 60° C. for 30 minutes. The polymer obtained was filtered off and then dried under reduced pressure at 60° C. for 24 hours. The yield was 44 g. The produced polymer grains had an average grain size of 630 μm and a scale content of 8.0%.

The amount of the monomers remaining in the polymer obtained was 0.1% by weight or less. The results of elemental analysis of the polymer obtained showed that the N-methylmaleimide unit in the produced polymer was 50 mol %. The polymer obtained had a molecular weight (Mw) of 90000, a glass transition temperature (Tg) of 154° C. and a decomposition temperature (Td) of 397° C. The optical characteristics of the polymer obtained are shown in Table 1.

EXAMPLE 8

38.72 g of N-methylmaleimide and 0.27 g of perbutyl neodecanoate were dissolved in acetonitrile, and 0.5 l of the thus-formed solution was charged in a 1-1 autoclave provided with an anchor-type agitator, an isobutene inlet tube, a nitrogen inlet tube, a thermometer and a deairing tube. After the solution was purged with nitrogen several times, 375 ml of liquefied isobutene was charged in the autoclave, followed by reaction at an agitation rate of 600 rpm and at 60° C. for 5 hours.

The precipitated grains were filtered off and then dried under reduced pressure at 60° C. for 24 hours. The yield was 57 g. The produced polymer grains had an average grain size off 240 μm and a scale content of 9.5%.

The amount of the monomers remaining in the polymer obtained was 0.1% by weight or less. The results of elemental analysis of the polymer obtained showed that the N-methylmaleimide unit in the produced polymer was 50 mol %. The polymer obtained had a molecular weight (Mw) of 220000, a glass transition temperature (Tg) of 155° C. and a decomposition temperature (Td) of 397° C. The optical characteristics of the polymer obtained are shown in Table 1.

EXAMPLE 9

Part of the polymer grains obtained in Example 8 were transferred to the reactor, and then agitated in 0.5 l of methanol at 60° C. for 30 minutes. The polymer was filtered off and then dried under reduced pressure at 60° C. for 24 hours. The optical characteristics of the polymer obtained are shown in Table 1.

COMPARATIVE EXAMPLE 1

117.7 g of N-methylmaleimide and 0.94 g of lauryl peroxide were dissolved in dioxane, and 1.5 l of the thus-formed solution was charged in a 3-1 autoclave provided with an anchor-type agitator, a nitrogen inlet tube, a thermometer and a deairing tube. After the solution was purged with nitrogen several times, 854 ml of isobutene was charged in the autoclave, followed by reaction at an agitation rate of 500 rpm and at 60° C. for 10 hours.

After the reaction was completed, the polymerization system was homogeneous. The polymer solution obtained was poured into ethanol to precipitate the polymer, and the produced polymer was filtered off and then dried under reduced pressure at 60° C. for 24 hours. The yield was 170 g. The amount of the monomers remaining in the polymer obtained was 0.5% by weight. The optical characteristics of the polymer obtained are shown in Table 1.

COMPARATIVE EXAMPLE 2

117 7 g of N-methylmaleimide and 0.94 g of lauryl peroxide were dissolved in dioxane, and 1.5 l of the thus-formed solution was charged in a 3-1 autoclave provided with an anchor-type agitator, a nitrogen inlet tube, a thermometer and a deairing tube. After the solution was purged with nitrogen several times, 854 ml of isobutene was charged in the autoclave, followed by reaction at an agitation rate of 500 rpm and at 60° C. for 10 hours.

After the reaction was completed, the polymerization system was homogeneous. The sample obtained by removing the solvent from the polymer solution obtained using an evaporator was dried under reduced pressure at 60° C. for 24 hours. The optical characteristics of the polymer obtained are shown in Table 1.

TABLE 1

| Sample | Light transmittance (%) | Yellowness |
|---|---|---|
| Example 1 | 92 | 3.3 |
| Example 2 | 92 | 3.2 |
| Example 3 | 92 | 3.0 |
| Example 4 | 91 | 3.7 |
| Example 5 | 92 | 3.3 |
| Example 6 | 91 | 3.5 |
| Example 7 | 92 | 3.1 |
| Example 8 | 92 | 3.2 |
| Example 9 | 92 | 2.9 |
| Comparative Example 1 | 84 | 8.5 |
| Comparative Example 2 | 77 | 23.7 |

The production method of the present invention is capable of efficiently producing a maleimide-olefin copolymer having very low yellowness and excellent optical characteristics such as transparency and the like. The polymer produced by the method can thus be applied to various optical elements, illumination parts and the like in a wide range.

What is claimed is:

1. A method of producing a maleimide-olefin copolymer by precipitation polymerization by radical copolymerization of a maleimide and an olefin, in which a polymerization solvent which will selectively dissolve maleimides and olefins and which will not dissolve the produced polymer to precipitate the produced polymer in a granular form, is used in production of a maleimide-olefin copolymer.

2. A method of producing a maleimide-olefin copolymer by radical copolymerization, comprising the steps of copolymerizing a maleimide having the formula:

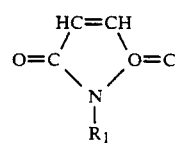

wherein $R_1$ is a (cyclo)alkyl group having 3 to 6 carbon atoms, and an olefin of the formula:

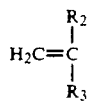

wherein $R_2$ and $R_3$ are each a hydrogen atom or an alkyl group having 1 to 6 carbon atoms, in a polymerization solvent which will selectively dissolve the maleimides and olefin monomers but will not dissolve the maleimide-olefin copolymer which is produced as a precipitate in granular form, and thereafter (2) recovering the maleimide-olefin copolymer precipitated.

3. The method according to claim 1 wherein the maleimide is methylmaleimide and the olefin is isobutene.

4. The method according to claim 1 wherein a polymerization solvent is used which produces polymer grains having an average grain size of 50 to 2000 μm and a bulk density of 0.1 to 1.0 g/cm³.

5. The method according to claim 4 wherein the polymerization solvent produces polymer grains having an average grain size of 100 to 1000 μm and a bulk density of 0.2 to 0.8 g/cm³.

6. The method according to claim 1 wherein said polymerization solvent is a mixture of solvents containing an aromatic solvent and at least one solvent selected from the group consisting of alcohols, ketones, ethers and acetates.

7. The method according to claim 6 wherein said polymerization solvent is a mixture of solvents containing an alcohol and an aromatic solvent.

8. The method according to claim 7, wherein the alcohol is methanol and the aromatic solvent is toluene.

9. The method according to claim 1 wherein said solvent is a mixture of solvents containing an acetate and at least one solvent selected from the group consisting of alcohols, ketones and ethers.

10. The method according to claim 1 wherein said polymerization solvent is a nitrile solvent.

11. The method according to claim 10 wherein said nitrile solvent is acetonitrile.

12. The method according to claim 1 wherein said polymerization solvent is an aromatic solvent having the formula:

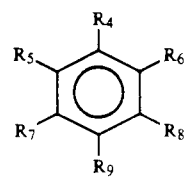

wherein $R_4$ to $R_9$ are independently a hydrogen atom, an alkyl group having 1 to 6 carbon atoms, a hydroxyl group or a halogen atom.

13. The method according to claim 1 including the additional steps of separating the precipitated polymer and than washing it with a solvent which will dissolve maleimides and olefins and which will not dissolve the polymer.

* * * * *